C. P. C. BRETSCHNEIDER.
SHOCK ABSORBER.
APPLICATION FILED NOV. 1, 1915.
1,195,182.
Patented Aug. 22, 1916.
3 SHEETS—SHEET 1.
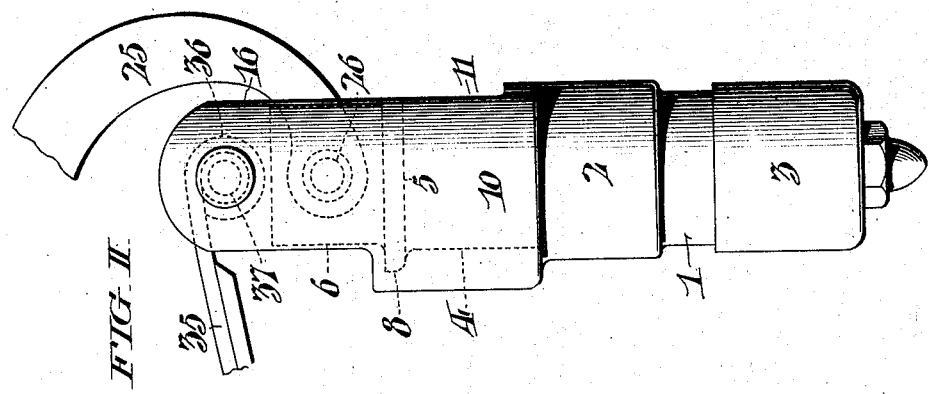
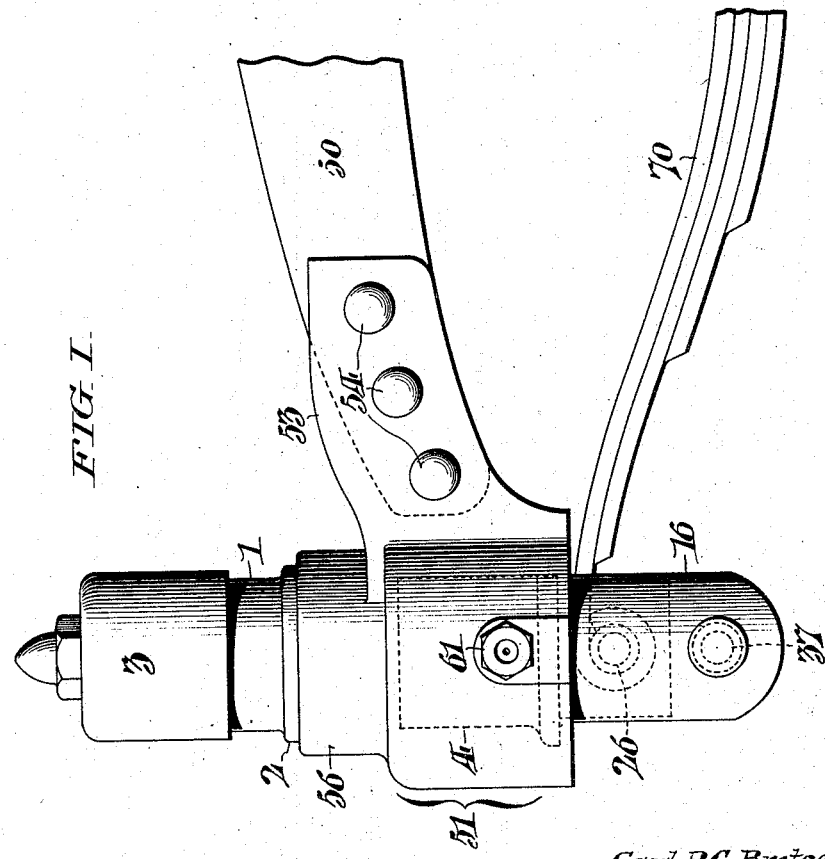
Inventor
Carl P. C. Bretschneider
By Macey & Paul
Attorneys
Witnesses
John C. Bergner
James E. Bell

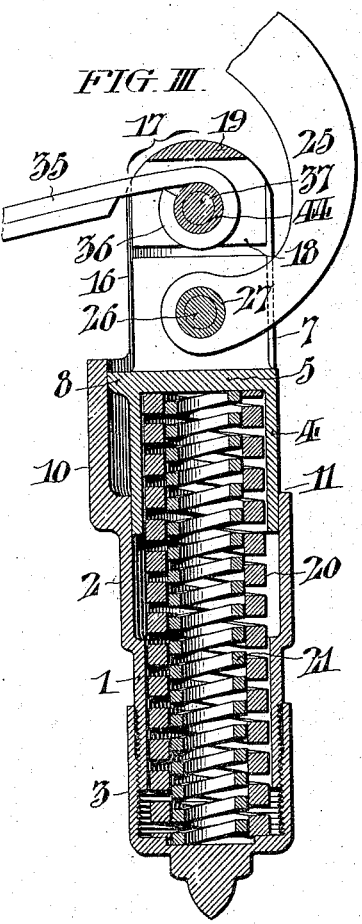
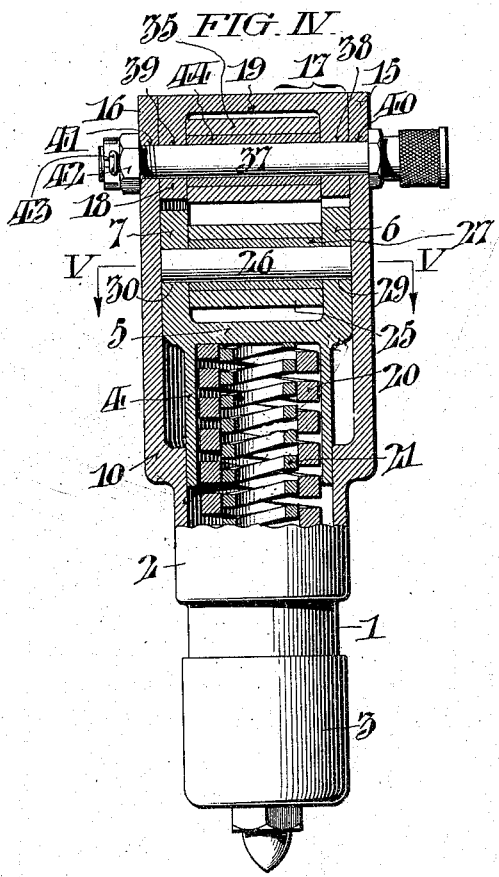
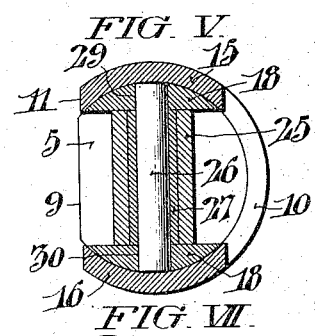
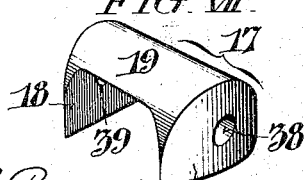

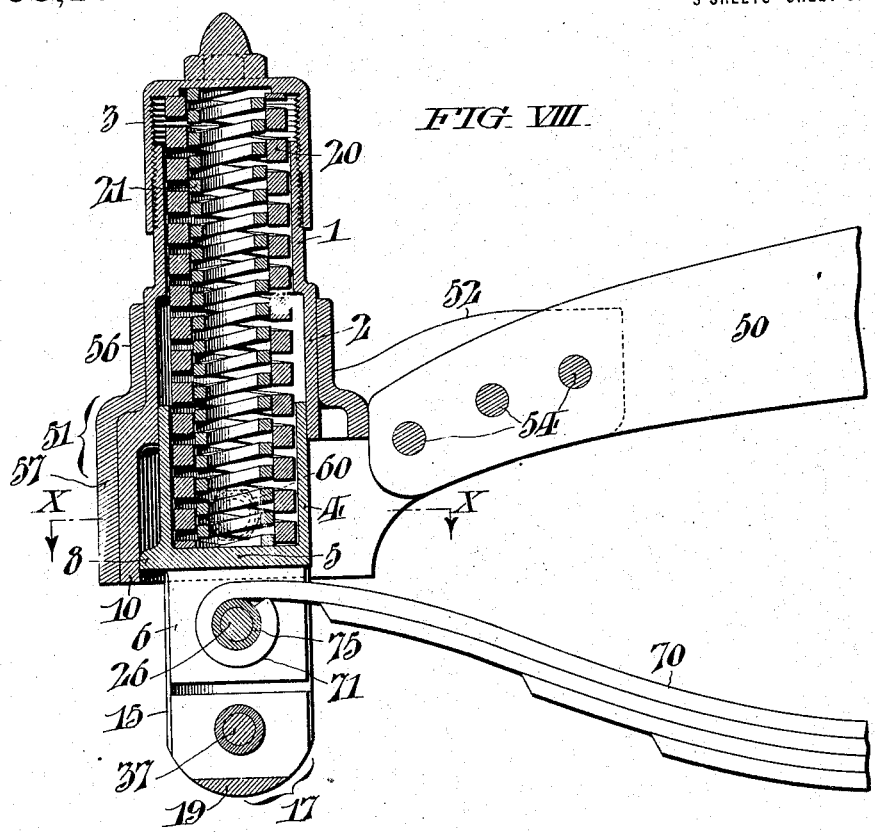
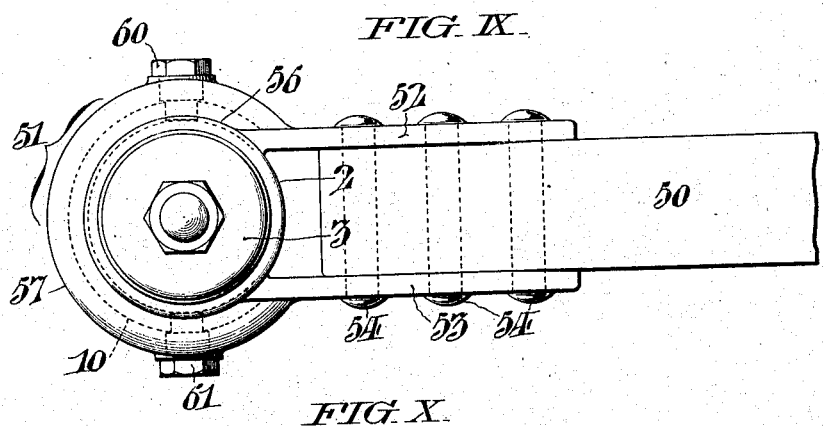
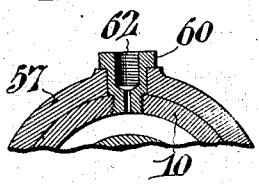

UNITED STATES PATENT OFFICE.

CARL P. C. BRETSCHNEIDER, OF PHILADELPHIA, PENNSYLVANIA.

SHOCK-ABSORBER.

1,195,182.  Specification of Letters Patent.  Patented Aug. 22, 1916.

Application filed November 1, 1915. Serial No. 58,952.

*To all whom it may concern:*

Be it known that I, CARL P. C. BRETSCHNEIDER, of Philadelphia, in the county of Philadelphia and State of Pennsylvania, have invented certain new and useful Improvements in Shock-Absorbers, whereof the following is a specification, reference being had to the accompanying drawings.

The primary purpose of my invention is to construct a shock-absorber which is capable of being used, interchangeably, either at the front or rear end of an ordinary type of motor vehicle. In the usual organization of the chassis with relation to the springs of the vehicle, the extension of the chassis which engages with the spring, is arranged above the point of attachment to the latter, at the front end of the vehicle, and extends below said point, at the rear end of the vehicle. Considering the shock-absorber as an intervening spring link connecting the vehicle spring and the chassis, and also as a compression member, the usual organization of parts requires that the spring element of the shock absorber should be arranged above the point of attachment of the vehicle spring at the front end of the vehicle, and below said point of attachment at the rear end.

In my present invention I provide an organization of parts in the shock absorber itself, which not only permits interchangeable use, as above indicated, but is peculiarly economical from the standpoint of forming the essential parts, greatly facilitates the assembling thereof, and affords a maximum amount of structural strength to the device when assembled.

Referring now to the accompanying drawings, Figure I is an external side elevation showing the shock absorber as attached to the front end of the chassis, and Fig. II, is a similar view, showing the device attached to the rear end thereof. Fig. III, is a vertical axial view through the shock absorber, and its points of attachment, corresponding with the employment of the device indicated in Fig. II, *i. e.*, at the rear end of the vehicle. Fig. IV, is a vertical section at right angles to that shown in Fig. III. Fig. V, is a transverse section on the line V, V, of Fig. IV. Figs. VI, and VII, are perspective views of certain of the interior parts. Fig. VIII, is a vertical section through the shock absorber and its points of support when in the position corresponding to that shown in Fig. I, *i. e.*, at the front end of the figure. Fig. IX, is a top or plan view thereof, and Fig. X, a partial transverse sectional view on the line X, X of Fig. VIII.

Referring to the shock absorber itself, and taking Figs. III to VII, for the commencement of the description, the main features comprise an external casing, which may be considered as generally cylindrical, but which comprises portions of different internal diameter, the external diameter also varying at said portions for economy of metal. Thus, the lower portion 1, is of the smallest diameter, and is threaded externally at its lower extremity to receive the internally threaded cup 3, which closes the bottom of the casing. Above the portion 1, the internal diameter is enlarged as shown at 2, in order to freely receive the cylindrical wall of the cap member 4, which closes the upper extremity of the spring chamber. Said cap member comprises a horizontal top 5, and two diametrical uprights 6, and 7, formed integrally therewith, said uprights being offset outwardly from the cylindrical wall 4, in order to afford a wide interspace for attachment to the point of support. This offset produces an external shoulder 8, which may be considered as annular, in that it extends throughout about three-quarters of the periphery, but may be cut away at one face, as indicated at 9, in Fig. VI.

The upper portion 10, of the external casing is of enlarged internal diameter, in order to freely receive said flange, and is itself cut away vertically at one side, as indicated at 11, so that the top of the external casing terminates at that side at a point which substantially corresponds with the termination of the portion having the internal diameter characteristic of the part 2. Thus, the cap 4, is supported and guided at both ends, the lower portion by its telescoping engagement with the internal wall of the part 2, of the casing, the upper portion by the engagement of the annular shoulder 8, with the internal wall of the portion 10, of the casing, but the free vertical space provided in the wall of said upper portion 10, permits vertical movement of the supporting member connected to the uprights 6, and 7. The upper portion of the casing 10, is also provided with two uprights 15, and 16, respectively, which are prolonged considerably above the upper extremity of the uprights 6, and 7.

The internal surfaces of the uprights 15, and 16, are bored with a cylindrical contour having the same radius as the cylindrical internal periphery of the portion 10, the two internal surfaces thus being continuous and similar. The external surfaces of the uprights 6, and 7, upon the cap member 4, have a true cylindrical contour, fitting snugly but freely within the uprights 15, and 16. A pair of coil-springs 20, and 21, are disposed in the usual reverse manner within the chamber formed by the cup 3, and cap member 4.

Fitting snugly within the upper extremities of the casing uprights 15, and 16, is a bridge piece 17, whose vertically depending walls 18, are turned with a true cylindrical contour, so as to slide freely vertically, with relation to the uprights, 15, and 16, the walls 18, being connected at the top by the transverse portion 19, which is preferably rounded, on its upper face, as shown in Fig. VII. As a matter of economic construction, I prefer to cast this bridge piece integrally with the cap 4, and its uprights 6, and 7, the walls 18, being, originally, continuations of said uprights. The casting, while still integral, may readily be turned, so as to have a true cylindrical contour, after which the bridge piece 17, is cut off transversely and becomes a separate element. Said bridge piece performs a double office, viz: that of a spacer and brace between the uprights 15, and 16, in which aspect it is functional at all times, and also that of an extended bearing for attachment to the vehicle under one of the alternative conditions of use.

Taking first the instance of employment of the device at the rear end of the chassis, as shown in Figs. II, III and IV, 25, represents the downwardly depending and reversedly-curved bearing projection of the chassis, whose extremity enters between the uprights 6, and 7, and is provided with an eye whereby it may be secured in position by means of a transverse pin 26, which is preferably provided with a bushing 27, the pin 26, extending through the holes 29, and 30, in the uprights, and having its extremities flush with the external walls of the latter. The vehicle spring 35, is provided at its extremity with an eye 36, which receives the transverse bolt 37, extending through holes 38, and 39, in the bridge piece, and similar holes 40, and 41, in the uprights 15, and 16, the end of said bolt being threaded to receive the proper securing device, as indicated by the crowned nut at 42, insured against dislodgment by a cotter pin 43. A bushing piece 44, is preferably provided for the bolt 37, said piece being maintained in the interspace between the walls 18, of the bridge piece. As thus employed, it will be noted that the cap 4, becomes what may be termed the stationary member of the shock-absorber, since it is attached to the chassis, while the inclosing casing and its uprights 15, and 16, become what may be termed the moving member, since being connected to the spring 35, it moves up and down with relation to the cap 4.

Taking now the employment of the device at the front end of the chassis, as indicated in Fig. VIII, all the structural parts just described remain, and are indicated by reference numerals similar to those heretofore employed. The following adjuncts, however, may be conveniently employed to attain this embodiment in a simple manner. Referring to Figs. VIII and IX, 50, represents the forwardly projecting portion of the chassis to which the shock absorber is to be attached. Near the extremity of the part 50, an inverted socket piece 51, is attached, preferably by means of the rearwardly projecting side pieces 52, and 53, secured by riveted bolts 54, which pass through the projection 50. These side pieces are preferably formed integrally with the socket piece 51, which latter has the cross section shown in Fig. VIII, where it will be noted that the socket, though generally cylindrical, has portions of different internal diameters. The upper portion 56, is adapted to receive and fit snugly around the portion 2, of the casing. The enlarged part 57, receives and fits snugly around the enlarged part 10, of the casing, and the external shoulder between the parts 2, and 10, fits into and bears against the correspondingly shaped internal shoulder at the region of union between the parts 56, and 57, thus affording a very firm and extended supporting surface between the casing of the shock absorber and the socket. The two parts may conveniently be secured together by means of screws 60, and 61, as shown clearly in Figs. IX, and X, the screws being preferably hollow, as indicated in the sectional view of Fig. X, and provided with an orifice 62, in order that they may serve as oiling devices.

The front spring 70, is provided with an eye 71, whereby it is secured to the pin 26, which passes through the uprights 6, and 7, a bushing 75, being provided, as in the instance previously described. It will be seen that when the device is thus employed, the casing of the shock-absorber becomes the stationary member, and the cap 4, with its uprights 6, and 7, becomes the moving member. The office of the bridge piece 17, as a spacer and support for the uprights 15, and 16, still continues in this organization, although obviously its incidental function of receiving the attaching pin and carrying the bushing therefor, no longer remains.

It will thus be seen that by the above organization of parts, I attain the advantages outlined in the beginning of the specification. The shock absorber itself is susceptible of use in either vertical position, and consequently available for attachment either at the front or rear of an automobile having the normal type of chassis. The feature of providing both pairs of uprights, and the bridge-piece with peripheries similarly cylindrical, enables the device to be readily made by turning or boring with a maximum of economy and at the same time insures proper support and free operation. The employment of the bridge-piece (economically produced as above stated by making it originally an integral part of the uprights of the cap) affords the proper structural strength under either condition of use, giving an added function under one of said conditions.

Having thus described my invention, I claim:

1. In a shock-absorber, the combination of a casing having a cylindrical interior periphery and provided with uprights having an internal cylindrical surface; a cap member having a wall with an external cylindrical surface adapted to fit snugly within the casing, said cap member being provided with uprights having an external cylindrical surface adapted to fit snugly within the uprights of the casing; a spring arranged within the chamber formed by the casing and the cap member; a bridge-piece provided with walls having an external cylindrical surface adapted to fit between the uprights of the casing; a transverse pin extending between the uprights of the cap and adapted to be connected with an external supporting member; and a transverse pin extending through the bridge-piece and the uprights of the casing, whereby the bridge-piece is attached to the casing, and may be attached to an external supporting member, substantially as set forth.

2. In a shock-absorber, the combination of a casing having a cylindrical interior periphery and provided with uprights having an internal cylindrical surface, said casing having an open end and a closed end, and a generally cylindrical external surface of different diameters at different longitudinal regions, the largest diameter being adjacent to the open end of the casing; a cap member having a wall with an external cylindrical surface adapted to fit snugly within the casing, said cap member being provided with uprights having an external cylindrical surface adapted to fit snugly within the uprights of the casing; a spring arranged within the chamber formed by the casing and the cap member; a bridge-piece provided with walls having an external cylindrical surface adapted to fit between the uprights of the casing; a transverse pin extending between the uprights of the cap and adapted to be connected with an external supporting member; a transverse pin extending through the bridge-piece and the uprights of the casing, whereby the bridge-piece is attached to the casing; a socket-piece with a generally cylindrical internal cavity of different diameters, adapted to snugly receive the enlarged end portion of the casing and the portion of less external diameter adjacent thereto; and means whereby said casing may be secured within the socket-piece, substantially as set forth.

3. In a shock-absorber, the combination of a casing having a cylindrical interior periphery and provided with uprights having an internal cylindrical surface, a cap member having a wall with an external cylindrical surface adapted to fit snugly within the casing, said cap member being provided with uprights having an external cylindrical surface adapted to fit snugly within the uprights of the casing; a spring arranged within the chamber formed by the casing and the cap member; a bridge-piece provided with walls having an external cylindrical surface adapted to fit between the uprights of the casing; a transverse pin extending between the uprights of the cap and adapted to be connected with an external supporting member; a transverse pin extending through the bridge-piece and the uprights of the casing, whereby the bridge-piece is attached to the casing; a socket piece adapted to fit snugly over the casing; and means whereby said casing is secured to said socket piece.

4. In a shock-absorber, the combination of a casing having an internal cylindrical surface of different diameters at different longitudinal regions, a cap member having an external cylindrical surface adapted to fit snugly within one portion of the casing, and provided with uprights having an external cylindrical surface adapted to fit snugly within another portion of the casing, means for connecting an external supporting member to said casing, a pin bridging said uprights and means for connecting an external supporting member to said pin.

In testimony whereof, I have hereunto signed my name, at Philadelphia, Pennsylvania, this twenty-eighth day of October, 1915.

CARL P. C. BRETSCHNEIDER.

Witnesses:
JAMES H. BELL,
E. L. FULLERTON.